Figure 1:
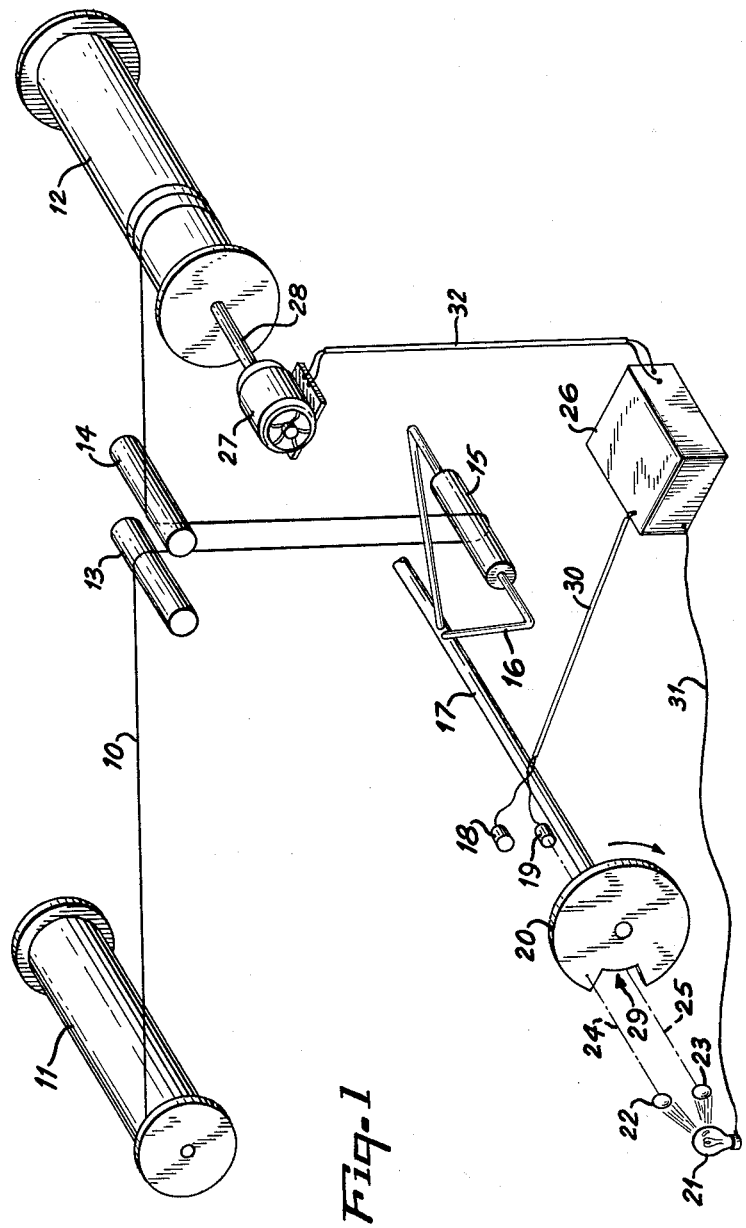

June 4, 1963  B. COOPER  3,092,764
PHOTOELECTRIC TENSION SENSING MOTOR CONTROL CIRCUIT
Filed June 8, 1961  3 Sheets-Sheet 1

INVENTOR.
B. COOPER
BY
Robert R. Strack
ATTORNEY

INVENTOR.
B. COOPER
BY
Robert R. Strack
ATTORNEY

United States Patent Office 3,092,764
Patented June 4, 1963

3,092,764
PHOTOELECTRIC TENSION SENSING MOTOR
CONTROL CIRCUIT
Benjamin Cooper, Waynesboro, Va., assignor to General
Electric Company, a corporation of New York
Filed June 8, 1961, Ser. No. 115,735
5 Claims. (Cl. 318—6)

This invention relates to automatic control systems and particularly to photoelectric control systems for controlling motor speed as a function of the position of a movable object.

In many applications it is necessary reliably to control the speed of a motor responsive to changes that are difficult to convert into the type of control voltages needed for operation of the motor. In such applications, sensitive means are required to convert the controlling variations into a usable form. An example of a system requiring motor speed control responsive to the position of a movable object is an arrangement for translating long lengths of flexible material from a first to a second location wherein it is desirable to maintain a constant tension on the material during translating.

It is common practice when transporting flexible material, to create a loop and to use the length of the loop as a control condition. In systems of this nature, in order to maintain the translation speed and tension on the material constant, it is merely necessary to keep the loop length constant. By inserting a roller, commonly called a "dancer roll," in the bottom of the loop, it is possible to couple the dancer roll to a voltage varying means for conversion of its physical position into a voltage which may be used to control the motor circuits. For example, a variable resistor or potentiometer in series with a fixed voltage may be controlled by the dancer roll position and in this way varying control voltages may be generated. Other devices used to convert position information into control voltages include solenoids, selsyns, and other magnetic devices.

Difficulty is experienced where the material being translated has low tensile strength. In such a case, only very slight forces are available for supporting and varying the position of a dancer roll and consequently, the control device must exhibit extremely low inertial qualities. Prior potentiometric and other arrangements have been unsatisfactory due to the amount of force required for operation, and also due to their variation over a period of time as a natural consequence of friction and wear.

It is an object of the invention to provide an improved motor speed control system employing a low inertia control device having long life and high reliability.

Another object of the invention is to provide means for insuring constant material speed in a system for translating flexible material from a first to a second location.

Another object of the invention is to provide a dancer loop control system responsive to extremely small amounts of pressure.

In accordance with an illustrative embodiment of the invention, a motor speed control system operating in conjunction with an arrangement for transferring a thread-like material from a first to a second storage drum, is described. The illustrated system comprises a pair of photoelectric elements serially connected across a voltage source, a light source illuminating the photoelectric elements, a shutter interposed between the light source and photoelectric elements for controlling the amount of illumination of each element by the source, and a dancer loop arrangement for controlling the position of the shutter with respect to the speed of a take-up motor connected to the second storage drum. The photoelectric elements exhibit a decrease in impedance in response to an increase in illumination and consequently, the voltage across each element is discretely representative of the illumination thereupon. The voltage across one element is used to develop control signals for control of the motor speed. These control signals are amplified and employed to control a control means such as a controlled rectifier to vary the amount of current in the armature of the motor in order to maintain the speed of material transfer constant under controlled tension conditions.

It should be understood that the embodiment describes the transfer of a thread-like material from a first to a second storage drum for illustrative purposes only. In fact, the invention is applicable in numerous systems including, but not limited to: systems wherein the material is extruded from suitable equipment in a non rigid state and translated to a removed location under the control of, and at a rate dictated by, a motor; and systems wherein low tensile strength materials are transferred, as from one conveyor to another.

Figure 2:
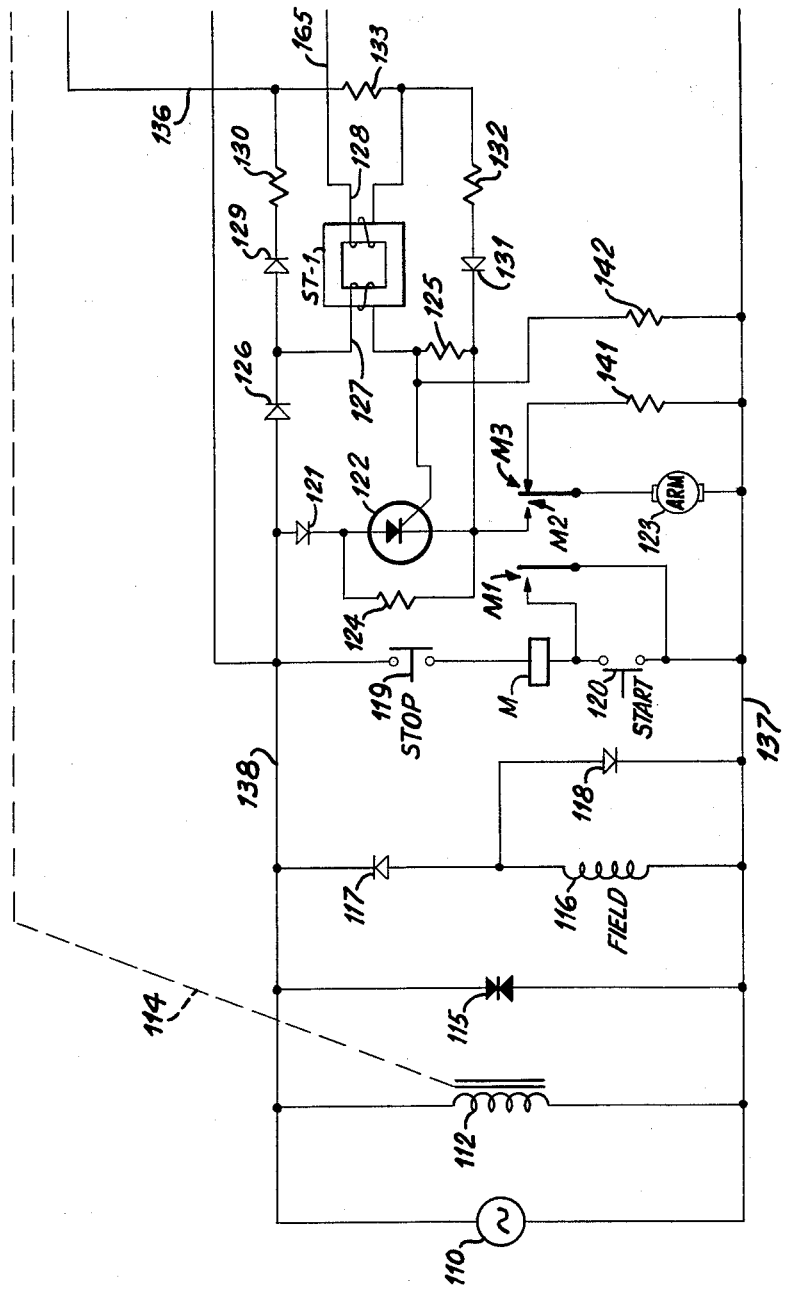
Figure 3:
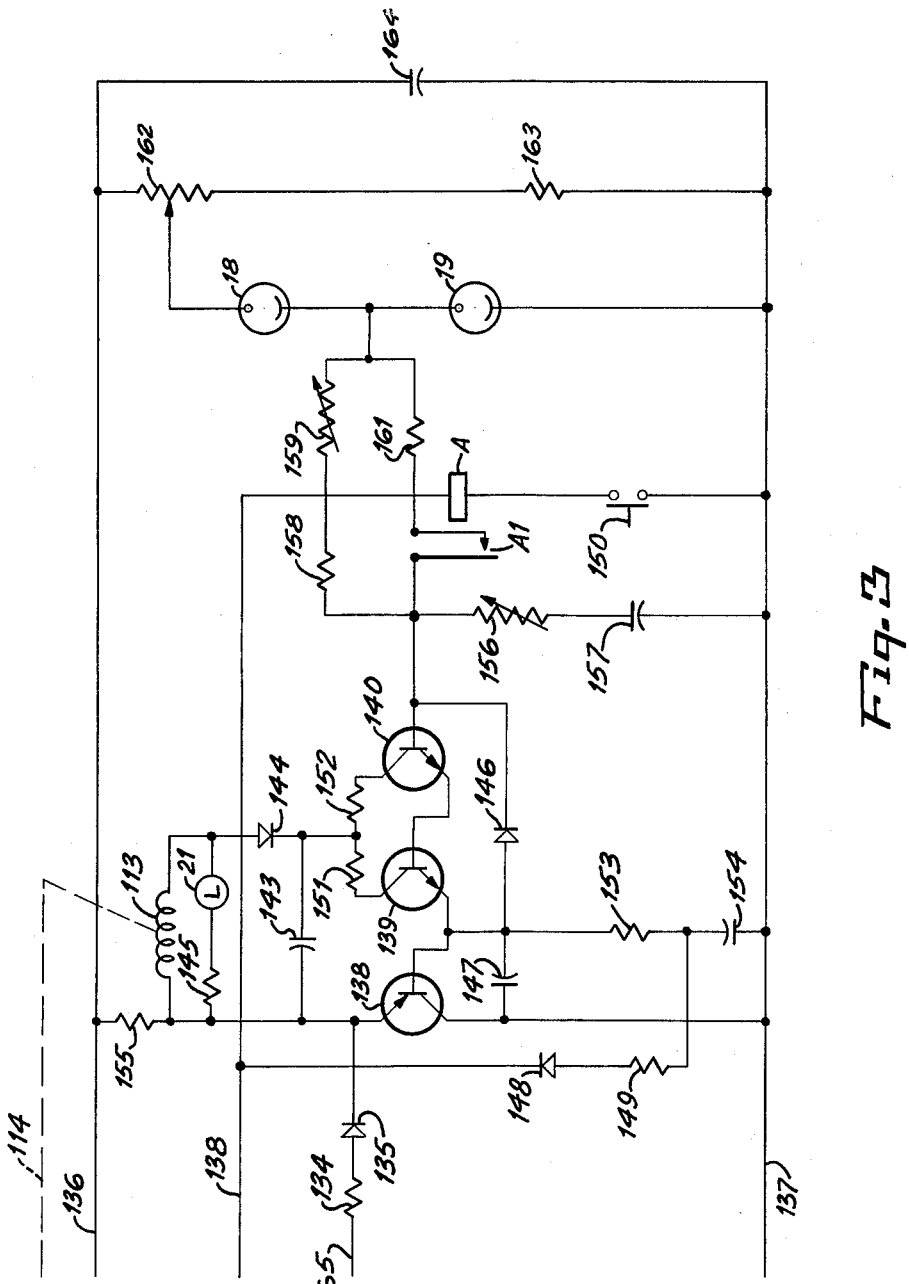

The novel features of the invention are set forth with particularity in the appended claims. The invention itself, however, both as to its organization and method of operation, together with further objects and fetaures thereof, may best be understood by reference to the following description taken in conjunction with the accompanying drawings wherein:

FIG. 1 diagrammatically illustrates a dancer loop control system in accordance with the invention; and FIG. 2 and FIG. 3, positioned side-by-side, comprise a circuit schematic of an embodiment of the invention using controlled rectifier means for controlling the current supplied to the armature of a motor and consequently, for controlling the speed of the motor.

FIG. 1 illustrates the relative positioning of the principal components employed in the embodiment illustrated. No attempt has been made to conform the dimensions in the illustration to the actual dimensions encountered in the embodiment, but rather, portions such as the shutter 20, have been exaggerated in size in order to illustrate more clearly their function. As shown, a thread-like material 10 is illustrated as being transferred from a first storage drum 11 to a second storage drum 12. It is understood that both drum 11 and 12 are suitably mounted upon axles (not shown) and may be oriented in any desired way. Drum 11 is driven by a means not shown so that in effect it is paying-out thread at a given rate. Drum 11, as mentioned above, may be replaced by an extruder or any other device which pays-out or extrudes fibers at a given rate. Drum 12 is rotated clockwise under the control of motor 27 which is coupled thereto by shaft 28. Shaft 28 is merely illustrative and may in fact comprise a plurality of suitable gears. A loop is formed by passing thread-like material 10 between rollers 13 and 14, and suspending dancer roll 15 therefrom. Dancer roll 15 freely rotates upon an axle 16 which is securely coupled to shaft 17. Shaft 17 is held in position by bearings (not shown) and has a shutter 20 mounted on one end thereof.

The described arrangement provides a system wherein an upward movement of dancer roll 15 is effective to rotate shaft 17 counter-clockwise and a downward movement of dancer roll 15 is effective to rotate shaft 17 clockwise. Since shutter 20 is securely mounted on shaft 17 it assumes a rotational position representative of the vertical position of dancer roll 15.

A pair of photoelectric elements 18 and 19 are positioned on one side of shutter 20. On the opposite side, illumination source 21 directs light beams 24 and 25 through collimating lenses 22 and 23 directly at elements 18 and 19, respectively. Shutter 20 has an aperture 29, of appropriate size to intersect all or a major part of either light beam 24 or 25 depending upon the rotational position of shutter 20. Photoelectric elements 18 and 19, lamp 21, and motor 27, are electrically connected by cables 30, 31, and 32 to a control box, 26, wherein the motor speed control circuitry illustrated in FIGS. 2 and 3 resides.

Although the illustration in FIG. 1 shows collimating lenses 22 and 23, other arrangements are possible without destroying the feature of varying the degree of illumination of each photoelectric element in accordance with the rotational position of shutter 20. For example, a light diffusing material may fill the shutter aperture 29 so that diffused light passes through to photoelectric elements 18 and 19. In this case, the photoelectric elements 18 and 19 may be placed in separate light-tight compartments with openings on one side placed in close proximity to the shutter 20 so that light passing through the diffusing material falls on the photoelectric elements. The amount of illumination to which each photoelectric element is exposed will thus be proportional to the area of the diffused light exposed.

The circuitry illustrated as box 26 in FIG. 1, which controls motor speed in response to the position of dancer roll 15, is schematically shown in FIGS. 2 and 3. These figures comprise a single circuit when positioned with FIG. 2 on the left of FIG. 3.

In FIG. 2, motor 27 is illustrated as a motor having an armature 123 and a shunt field winding 116. The speed of motor 27 is directly controlled by controlling the current through the armature 123 with a silicon controlled rectifier 122 connected in series therewith. As well known, silicon controlled rectifiers are rendered highly conductive by applying a positive gating potential between the gate and cathode terminals thereof when there is a forward biasing potential between the anode and cathode, and are rendered nonconductive by application of a reverse-biasing potential between the cathode and anode thereof. In the instant circuit, controlled rectifier 122 is rendered conductive under the control of the saturable transformer ST-1 illustrated on the right of FIG. 2. Saturable transformer ST-1 is controlled, as described hereinafter, to establish a positive gating potential between the gate and cathode electrodes of controlled rectifier 122 at a time determined by the rate of material transfer as indicated by the condition of photoconductive elements 18 and 19. These elements are illustrated on the right of FIG. 3 and are connected to reset winding 128 of saturable transformer ST-1 by a plurality of transistor amplifiers 138, 139, and 140.

In general, as material 10 accumulates on drum 12 in FIG. 1, it is necessary to decrease motor speed in order to maintain the rate of transfer and the tension on the material constant. The requirement for a change in motor speed is indicated by an upward movement of dancer roll 15 shown in FIG. 1. This movement is reflected by a counter-clockwise rotation of shutter 20 and consequent greater exposure of photoelectric element 19 than that of photoelectric element 18. The change in illumination of the photoelectric elements changes the input to the transistor amplifiers 138, 139, and 140 and this in turn changes the current flow in reset winding 128 of saturable transformer ST-1. As subsequently described, the change in saturation of saturable transformer ST-1 resulting from varying degrees of current flow through reset winding 128, determines the time at which controlled rectifier 122 is rendered conductive and consequently, determines the amount of current supplied to the armature 123 of take-up motor 27. Responsive to this change in armature current, take-up motor 27 attains a speed at which dancer roll 15, under the tension of material 10, assumes the desired equilibrium position.

A complete understanding of the operation and functioning of the various elements of the control circuit shown in FIGS. 2 and 3 will be available from the following detailed description.

The control circuit is energized by a source of alternating voltage 110 shown at the left in FIG. 2. The alternating voltage from source 110 is applied to a transformer primary 112 which is inductively coupled to a secondary winding 113, appearing in FIG. 3. Dashed line 114 indicates this coupling. Secondary winding 113 has induced therein an alternating voltage which is half-wave rectified by diode 144 and smoothed by capacitor 143 for use in biasing NPN transistors 139 and 140 to operate as class A emitter followers. Device 115 is a transient voltage snubbing element which protects controlled rectifier 122 from spike voltages which may be fed in from the voltage source 110. It may be noted that field winding 116 is serially connected with diode 117 between conductors 137 and 138 and consequently, is energized during each negative half cycle from source 110. Diode 118 is connected in the conventional "free-wheeling" circuit to provide field current conduction during the opposite half cycle.

Motor 27 is started by closure of start button 120 which establishes an energization circuit for A.C. motor relay M from conductor 138 to conductor 137, including: normally closed stop button 119, the windings of relay M, and start button 120. Upon operation, motor relay M closes contacts M1 and M2 and opens normally closed contacts M3. This places armature 123 across the conductors 138 and 137 in series with diode 121 and controlled rectifier 122. Both diode 121 and controlled rectifier 122 are oriented to conduct current during the positive half cycle only. Closure of contacts M1 is effective to short circuit start contacts 120 and consequently, release of the start button does not disturb the energization circuit of motor relay M. A protective resistor 124 is connected between the anode and cathode terminals of controlled rectifier 122. This resistor is of a relatively large magnitude and does not affect the fact that armature 123 receives substantial current only during conduction of controlled rectifier 122.

At the initiation of each positive half cycle of voltage from source 110, controlled rectifier 122 is in a non-conducting state. At a time determined by the position of dancer loop 15, a positive gating potential is applied between the gate and cathode electrodes of controlled rectifier 122 rendering it conductive and consequently establishing a low impedance path through armature 123 from conductor 138 to conductor 137. The gating potential is applied via diode 126 and winding 127 of saturable transformer ST-1 at the instant when saturable transformer ST-1 is saturated. Control over this point of time is established during each negative half cycle by selective energization of reset winding 128.

The degree of initial, or reset saturation, of saturable transformer ST-1 is controlled by dancer loop 15 via the amount of illumination upon photoelectric elements 18 and 19. As shown in FIG. 3, photoelectric elements 18 and 19 are serially connected across a reference voltage source in the form of a reference potentiometer 162 and a resistor 163. Potentiometer 162 and resistor 163 are supplied by the positive half cycles of current from source 110 in the circuit comprising: conductor 138, diodes 126 and 129, resistor 130, conductor 136, potentiometer 162, resistor 163, and conductor 137. A storage capacitor 164 shunts potentiometer 162 and resistor 163 and is charged during each positive half cycle of current. Thus, during each negative half cycle, discharge of capacitor 164 through potentiometer 162 and resistor 163 maintains the upper terminal of potentiometer positive and of relatively constant magnitude. Photoelectric elements 18 and 19 are connected to the slider of potentiometer 162 and consequently, a relatively stable direct voltage of any preselected magnitude may be furnished thereto.

Photoelectric elements 18 and 19 exhibit the characteristic of decreasing impedance in response to increasing light intensity. Consequently, photoelectric elements 18 and 19 act as a variable potentiometer, the voltage between the junction thereof and conductor 137 varying in accordance with the amount of light illuminating respective cells. When the material is issuing slowly from reel 11, dancer roll 15 in FIG. 1 will be relatively high and shutter 20 will permit more complete illumination of photoelectric element 19 and minimum illumination of photoelectric element 18. The low impedance of element 19 under these conditions results in a relatively low positive voltage between the junction of elements 18 and 19, and conductor 137. On the other hand, when the material transfer speed is fast, dancer roll 15 will be relatively low and shutter 20 will permit more complete illumination of element 18 and minimum illumination of element 19. In this case, a maximum positive voltage appears between the junction of elements 18 and 19 and conductor 137, because the impedance of photoelectric element 18 is at a minimum.

The voltage appearing between the photoelectric elements 18 and 19 is normally applied through variable resistor 159 and resistance 158 to the base electrode of transistor 140, thereby controlling the conduction thereof in accordance with the material transfer speed.

Variable resistance 156 and capacitor 157 are connected between the base of transistor 140 and conductor 137 to form a stabilizing circuit and thus prevent hunting or oscillation during normal operation.

As previously mentioned, transistors 139 and 140 are connected in emitter follower circuits and are energized via secondary winding 113, the alternating current available therefrom being rectified by diode 144 and filtered by capacitor 143 to provide a substantially constant direct current. Specifically, the rectified voltage from diode 144 is applied via resistors 151 and 152 to the collectors of transistors 139 and 140 respectively. The emitter of transistor 140 is directly connected to the base of transistor 139 and the emitter of transistor 139 is connected via resistor 153 to a negative bias voltage across capacitor 154. This bias voltage is established via resistor 149 and diode 148 to conductor 138. A clipping diode 146 interconnects the emitter of transistor 139 and the base of transistor 140 to limit the base voltage applied to transistors 139 and 140. The voltages applied by the various circuit elements are adjusted to maintain transistors 139 and 140 in class A operation in response to the signals applied to the base of transistor 140 by the photoelectric elements 18 and 19.

PNP transistor 138 is connected as an emitter follower and receives the output signal from transistor 139 at its base electrode. The emitter of transistor 138 is connected to a positive supply at conductor 136 via load resistor 155, and the collector of transistor 138 is connected to conductor 137. A by-pass capacitor 147 is connected between the collector and base of transistor 138.

The function of the emitter follower containing transistor 138 is to control the amount of current flow through reset winding 128 during each negative half cycle of voltage from source 110 in accordance with the voltage produced at the junction of photoelectric elements 18 and 19. Thus, the power level of the control signals applied to the base of transistor 140 is increased successively by the emitter follower circuits utilizing transistors 140, 139, and 138 for application via diode 135 and resistor 134 to reset winding 128 of saturable transformer ST-1.

Reset winding 128 of saturable transformer ST-1 has a current flowing therethrough at all times irrespective of the condition of photoelectric elements 18 or 19. The reset current for saturable transformer ST-1 is conducted in the path comprising the D.C. voltage appearing across capacitor 164, conductor 136, resistor 133, winding 128, resistor 134, diode 135, transistor 138, and conductor 137. The magnitude of the reset action is controlled by the conduction level of transistor 138 and the effect of the feedback voltage applied through resistor 132 and diode 131 from armature 123 during the negative half cycle. It is the current flow during the negative half cycle which is of interest because this determines the initial state of magnetic polarization of saturating transformer ST-1 when a positive half cycle is applied to winding 127.

The initial state of polarization determines at what point in the cycle controlled rectifier 122 will be triggered and consequently controls the speed of motor 127. It will be noted that each reset control circuit includes transistor 138. As described, transistor 138 conducts in accordance with the signal applied to its base electrode and this signal is proportional to the desired motor speed. When it is desired to trigger controlled rectifier 122 earlier in the cycle of operation, thereby increasing motor speed, the initial opposing polarization of saturating transformer ST-1 is made relatively slight. This is accomplished by limiting the current flow in the reset path and this in turn is a direct result of a relatively positive signal being applied to the base of transistor 138.

In recapitulation, with reference to FIG. 1, under normal operating conditions as reel 12 fills with layers of material 10 the diameter thereof increases and the rate at which material 10 is transferred between spool 11 and spool 12 tends to increase if the speed of motor 27 remains constant. The increase in speed tends to decrease the loop length and dancer roll 15 moves vertically upward causing shutter 20 to rotate counter-clockwise, thereby increasing the illumination of photoelectric element 19 and decreasing the illumination of photoelectric element 18. The decreased illumination of photocell 18 increases the impedance thereof whereas the increased illumination of cell 19 decreases its impedance. As a consequence of these impedance changes the voltage appearing at the junction between elements 18 and 19 in FIG. 3 tends to go down. The decreased voltage at the junction, is transmitted to the collector of transistor 140 via variable resistance 159 and fixed resistor 158. As previously described, this decreased voltage is current amplified in transistors 140, 139, and 138 and is effective to increase the conduction of transistor 138. The increased conduction renders the reset path previously described effective to initially polarize saturable transformer ST-1 to a substantial degree in a reverse direction from that established during the positive half cycle by winding 127. During the positive half cycle when voltage is applied through diode 126 to windings 127, it takes a longer period of time to saturate saturable transformer ST-1 and consequently, to develop a positive gating potential between the gate and cathode elements of controlled rectifier 122. The relatively longer period before conduction of controlled rectifier 122 insures that current is supplied to armature 123 for a shorter period of time and the motor speed decreases as desired.

Attention is directed to acceleration relay A and its contacts A1 appearing in the righthand portion of FIG. 3. This relay is energized by operation of acceleration contacts 150 to provide a low impedance path from the junction of photoelectric elements 18 and 19 through resistor 161 to the base of transistor 140. The purpose of this low impedance path is to permit manual acceleration of motor 27. Once the motor is within the range of desired operation, acceleration contacts 150 are released and the normal control circuit permitted to function.

A single illustrative embodiment has been described whereby a material may be transferred from a first to a second storage medium under the control of a low inertia photoelectric control system. While there has been shown a particular embodiment of the invention, it will, of course, be understood that it is not wished to be limited thereto since modifications may be made both in the circuit arrangement and in the instrumentalities employed and it is contemplated in the appended claims to cover any such modifications as fall within the true spirit and scope of the invention.

What is claimed as new and desired to be secured by Letters Patent of the United States is:

1. In a system for transferring long fragile material from a first location to a second location at a rate determined by the speed of a motor, a dancer roll suspended by said fragile material between said first and said second location, a source of illumination, a source of voltage, a pair of photoelectric elements serially connected across said source of voltage, shutter means coupled to said dancer roll and interposed between said source of illumination and said photoelectric elements, said shutter means being effective to selectively enable illumination of said photocells in accordance with the position of said dancer roll, motor speed control means responsive to voltage to adjust the speed of said motor, and means controlled by the voltage appearing across one of said photoelectric elements for supplying the correct voltage to said motor control means to maintain the rate of transfer of said fragile material constant.

2. In a system for transferring a fragile material from a first location to a second location at a rate determined by the speed of a motor, means for creating a loop of said fragile material between said first and second location, follower means residing at the bottom of said loop, a source of illumination, a source of voltage, a pair of elements each exhibiting the characteristic of decreasing impedance in response to increasing illumination serially connected across said source of voltage, shutter means coupled to said follower means and interposed between said source of illumination and said pair of elements, said shutter means being responsive to the position of said follower to selectively control the degree of illumination of said elements, controlled rectifier means operative to selectively control the application of current to the armature of said motor in response to an enabling voltage, and means responsive to the voltage appearing across one of said elements to apply said enabling voltage to said controlled rectifier at a time determined by the magnitude of said voltage.

3. In a system for transferring a material from a first location to a second location at a rate determined by the speed of a motor, follower means suspended from said material between said first and said second location, a source of illumination, a source of voltage, a pair of photoelectric elements serially connected across said source of voltage, rotatable shutter means coupled to said follower means and interposed between said source of illumination and said photoelectric elements, said shutter means being rotatable in response to vertical motion of said follower means to control the illumination of said photo cells in accordance with the vertical position of said follower means, control means responsive to voltage to adjust the speed of said motor, and means controlled by the voltage appearing across one of said photoelectric elements for supplying the correct voltage to said control means to maintain the rate of transfer of said material constant.

4. In a system for transferring a material from a first location to a second location at a rate determined by the speed of a motor wherein said material is paid out from said first location at a predetermined rate, follower means suspended from said material between said first and second location, a source of energy radiation, a source of voltage, a pair of elements each exhibiting the characteristic of commensurate change in impedance in response to a change in the amount of said energy impinging upon the surface thereof serially connected across said source of voltage, shutter means interposed between said source of energy radiation and said pair of elements and responsive to the position of said follower means to control the amount of energy impinging upon said elements, control means responsive to voltage to adjust the speed of said motor, and means controlled by the voltage appearing across one of said elements for supplying the correct voltage to said motor control means to maintain the rate of transfer of said material constant.

5. In a system for transferring a material from a first location to a second location at a rate determined by the speed of a motor, means for creating a loop of said material between said first and second location, follower means residing at the bottom of said loop, a source of energy radiation, a source of voltage, a pair of elements each exhibiting the characteristic of commensurate change in impedance in response to a change in the amount of said energy impinging upon the surface thereof serially connected across said source of voltage, shutter means coupled to said follower means and interposed between said source of energy radiation and said pair of elements, said shutter means being responsive to the position of said follower to selectively control the degree of radiation impinging upon said elements, controlled rectifier means operative to selectively control the application of current to the armature of said motor in response to an enabling voltage, and means responsive to the voltage appearing across one of said elements to apply said enabling voltage to said controlled rectifier at a time determined by the magnitude of said voltage.

References Cited in the file of this patent

UNITED STATES PATENTS

| | | |
|---|---|---|
| 1,976,611 | Gulliksen | Oct. 9, 1934 |
| 2,281,954 | Rinia | May 5, 1942 |
| 2,379,132 | Cook | June 26, 1945 |
| 2,586,076 | Nichols | Feb. 19, 1952 |
| 2,977,523 | Cockrell | Mar. 28, 1961 |
| 2,990,484 | Jones | June 27, 1961 |

FOREIGN PATENTS

| | | |
|---|---|---|
| 739,669 | Germany | Oct. 1, 1943 |
| 958,622 | France | Mar. 14, 1950 |